(12) United States Patent
Namuduri et al.

(10) Patent No.: US 12,151,573 B2
(45) Date of Patent: Nov. 26, 2024

(54) VEHICLE CHARGING USING A MULTI-DRIVE SYSTEM

(71) Applicant: GM GLOBAL TECHNOLOGY OPERATIONS LLC, Detroit, MI (US)

(72) Inventors: Chandra S. Namuduri, Troy, MI (US); Rashmi Prasad, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 157 days.

(21) Appl. No.: 17/948,597

(22) Filed: Sep. 20, 2022

(65) Prior Publication Data

US 2024/0092203 A1  Mar. 21, 2024

(51) Int. Cl.
| | |
|---|---|
| *B60L 7/06* | (2006.01) |
| *B60L 7/26* | (2006.01) |
| *B60L 50/60* | (2019.01) |
| *B60L 53/24* | (2019.01) |
| *H02J 7/00* | (2006.01) |
| *H02M 3/158* | (2006.01) |
| *H02P 5/74* | (2006.01) |

(52) U.S. Cl.
CPC .............. *B60L 53/24* (2019.02); *B60L 50/60* (2019.02); *H02J 7/00712* (2020.01); *H02M 3/1582* (2013.01); *H02P 5/74* (2013.01); *B60L 2210/40* (2013.01); *H02J 2207/20* (2020.01)

(58) Field of Classification Search
CPC ...... B60L 53/24; B60L 50/60; B60L 2210/40; B60L 53/14; B60L 2210/10; B60L 2210/30; H02J 7/00712; H02J 2207/20; H02M 3/1582; H02P 5/74; Y02T 10/70; Y02T 10/7072; Y02T 90/14; Y02T 10/72; Y02T 90/12

USPC ...... 307/9.1, 10.1, 77, 45, 46; 320/138, 137, 320/109; 318/139, 138; 108/65.29

See application file for complete search history.

(56) References Cited

U.S. PATENT DOCUMENTS

2019/0359072 A1* 11/2019 Takeda ...................... B60L 1/00
2022/0285971 A1* 9/2022 Gannamaneni ......... B60L 53/57

FOREIGN PATENT DOCUMENTS

CN  112910037 A  * 6/2021 .............. B60L 15/20
JP  2009284560 A  * 12/2009

* cited by examiner

*Primary Examiner* — Elim Ortiz

(74) *Attorney, Agent, or Firm* — CANTOR COLBURN LLP

(57) ABSTRACT

A charging system of a vehicle includes a first conversion device of a first drive system of the vehicle, the first conversion device connected to a first electric motor. The system also includes a second conversion device of a second drive system of the vehicle, the second conversion device connected to a second electric motor. The first drive system and the second drive system are connected to a battery system of the vehicle. The system also includes a switching assembly including a plurality of switches configured to selectively connect the first electric motor and/or the second electric motor to a charge port of the vehicle, and a controller configured to control the switching assembly to define a conversion circuit that includes components of the first drive system and/or the second drive system, and control the conversion circuit to regulate an output voltage and supply power to an energy storage system.

20 Claims, 4 Drawing Sheets

VEHICLE CHARGING USING A MULTI-DRIVE SYSTEM

INTRODUCTION

The subject disclosure relates to vehicles, and more specifically, to supplying electric energy from a vehicle.

Vehicles, including gasoline and diesel power vehicles, as well as electric and hybrid electric vehicles, feature battery storage for purposes such as powering electric motors, electronics and other vehicle subsystems. In situations where an electric vehicle has insufficient battery charge and charging is not immediately available, options such as vehicle-to-vehicle (V2V) charging can be employed. In some cases, the battery voltage between a vehicle that provides power and the vehicle being charged is different, which can limit the availability of charging options. Accordingly, it is desirable to provide a device or system that can provide charging capability that supports energy exchange between vehicles and/or energy storage systems having dissimilar voltage characteristics.

SUMMARY

In one exemplary embodiment, a charging system of a vehicle includes a first conversion device of a first drive system of the vehicle, the first conversion device connected to a first electric motor. The system also includes a second conversion device of a second drive system of the vehicle, the second conversion device connected to a second electric motor. The first drive system and the second drive system are connected to a battery system of the vehicle. The system also includes a switching assembly including a plurality of switches configured to selectively connect at least one of the first electric motor and the second electric motor to a charge port of the vehicle, and a controller configured to control the switching assembly to define a conversion circuit that includes components of at least one of the first drive system and the second drive system, and control the conversion circuit to regulate an output voltage and supply power to an energy storage system.

In addition to one or more of the features described herein, the energy storage system includes a battery of a second vehicle.

In addition to one or more of the features described herein, the conversion circuit includes at least one of a boost converter circuit and a buck converter circuit.

In addition to one or more of the features described herein, the controller is configured to perform defining the boost converter circuit by disconnecting the battery system from a propulsion bus, controlling the switching assembly to connect the battery system to the charge port, and connecting the battery system and the charge port to a phase of the first motor and to a switching device of the first conversion device, and/or the controller is configured to perform defining the buck converter circuit by disconnecting the battery system from the propulsion bus, controlling the switching assembly to connect the battery system to the charge port, and connecting the battery system and the charge port to a phase of the second motor and to a switching device of the second conversion device.

In addition to one or more of the features described herein, the controller is configured to perform at least one of stepping up a received voltage from the battery assembly to the output voltage by operating the switching device of the first conversion device, and stepping down the received voltage to the output voltage by operating the switching device of the second conversion device.

In addition to one or more of the features described herein, the controller is configured to simultaneously define the boost converter circuit and the buck converter circuit to increase or decrease the received voltage.

In addition to one or more of the features described herein, one of the first conversion device and the second conversion device is operated in a pass-through mode while another of the first conversion device and the second conversion device is operated to define the buck converter circuit or the boost converter circuit.

In addition to one or more of the features described herein, the first conversion device is a first inverter and the second conversion device is a second inverter, and the switching assembly includes a first switch configured to selectively connect a phase of the first motor and the first inverter to the charge port, and a second switch configured to selectively connect a phase of the second motor and the second inverter to the charge port.

In addition to one or more of the features described herein, the first switch is connected to a neutral point of the first motor, and the second switch is connected to a neutral point of the second motor.

In another exemplary embodiment, a method of charging an energy storage system from a battery system of a vehicle includes receiving a request to charge the energy storage system from the vehicle, the vehicle including a first drive system having a first conversion device connected to a first electric motor, and a second drive system having a second conversion device connected to a second electric motor. The first drive system and the second drive system are connected to the battery system of the vehicle. The method also includes determining charging parameters including a requested charging voltage, and controlling a switching assembly including a plurality of switches to selectively connect at least one of the first electric motor and the second electric motor to a charge port of the vehicle, and define a conversion circuit that includes components of at least one of the first drive system and the second drive system. The method further includes controlling the conversion circuit to regulate an output voltage to supply power to the energy storage system at the requested charging voltage.

In addition to one or more of the features described herein, the energy storage system includes a battery of a second vehicle.

In addition to one or more of the features described herein, the conversion circuit includes at least one of a boost converter circuit and a buck converter circuit, and defining the conversion circuit includes defining the boost converter circuit by disconnecting the battery system from a propulsion bus, controlling the switching assembly to connect the battery system to the charge port, and connecting the battery system and the charge port to a phase of the first motor and to a switching device of the first conversion device, and/or defining the conversion circuit includes defining the buck converter circuit by disconnecting the battery system from the propulsion bus, controlling the switching assembly to connect the battery system to the charge port, and connecting the battery system and the charge port to a phase of the second motor and to a switching device of the second conversion device.

In addition to one or more of the features described herein, controlling the switching assembly includes stepping up a received voltage from the battery assembly to the output voltage by operating the switching device of the first conversion device, and/or stepping down the received voltage to the output voltage by operating the switching device of the second conversion device.

In addition to one or more of the features described herein, defining the conversion circuit includes simultaneously defining the boost converter circuit and the buck converter circuit to increase or decrease the received voltage.

In addition to one or more of the features described herein, one of the first conversion device and the second conversion device is operated in a pass-through mode while another of the first conversion device and the second conversion device is operated to define the buck converter circuit or the boost converter circuit.

In yet another exemplary embodiment, a vehicle system includes a memory having computer readable instructions, and a processing device for executing the computer readable instructions, the computer readable instructions controlling the processing device to perform a method. The method includes receiving a request to charge the energy storage system from the vehicle, the vehicle including a first drive system having a first conversion device connected to a first electric motor, and a second drive system having a second conversion device connected to a second electric motor, the first drive system and the second drive system connected to the battery system of the vehicle. The method also includes determining charging parameters including a requested charging voltage, controlling a switching assembly including a plurality of switches to selectively connect at least one of the first electric motor and the second electric motor to a charge port of the vehicle, and define a conversion circuit that includes components of at least one of the first drive system and the second drive system, and controlling the conversion circuit to regulate an output voltage to supply power to the energy storage system at the requested charging voltage.

In addition to one or more of the features described herein, the conversion circuit includes at least one of a boost converter circuit and a buck converter circuit, and defining the conversion circuit includes defining the boost converter circuit by disconnecting the battery system from a propulsion bus, controlling the switching assembly to connect the battery system to the charge port, and connecting the battery system and the charge port to a phase of the first motor and to a switching device of the first conversion device, and/or defining the conversion circuit includes defining the buck converter circuit by disconnecting the battery system from the propulsion bus, controlling the switching assembly to connect the battery system to the charge port, and connecting the battery system and the charge port to a phase of the second motor and to a switching device of the second conversion device.

In addition to one or more of the features described herein, controlling the switching assembly includes at least one of stepping up a received voltage from the battery assembly to the output voltage by operating the switching device of the first conversion device, and stepping down the received voltage to the output voltage by operating the switching device of the second conversion device.

In addition to one or more of the features described herein, defining the conversion circuit includes simultaneously defining the boost converter circuit and the buck converter circuit to increase or decrease the received voltage.

In addition to one or more of the features described herein, the first conversion device is a first inverter and the second conversion device is a second inverter.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
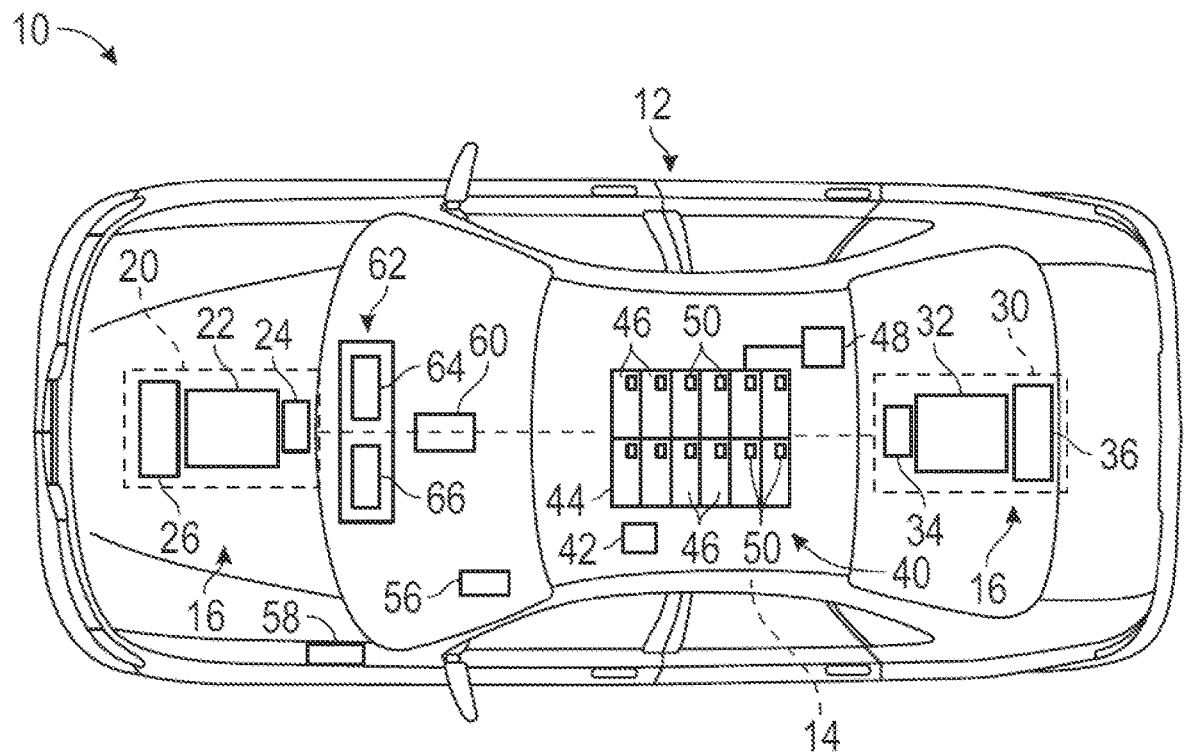
FIG. 1 is a top view of a motor vehicle including a battery assembly or system and a multi-drive system, in accordance with an exemplary embodiment.

The following description is merely exemplary in nature and is not intended to limit the present disclosure, its application or uses. It should be understood that throughout the drawings, corresponding reference numerals indicate like or corresponding parts and features.

In accordance with exemplary embodiments, methods, devices and systems are provided for supplying electrical power from a battery system of a vehicle (e.g., an electric or hybrid vehicle) to an energy storage system, such as a battery of another vehicle. Embodiments of a charging system are configured to provide a variable output voltage for charging by utilizing components of the vehicle's propulsion system to regulate an output voltage. The system is capable of outputting a wide range of voltages (e.g., about 200 Volts (V) to about 925 V). Thus, the system is capable of using a wide variety of charging schemes, including legacy charging and DC fast charging (DCFC).

In an embodiment, the vehicle is a dual or multi-drive system that uses two or more electric motors for propulsion. The charging system uses components of an inverter and a motor of one drive system and/or components of an inverter and a motor from another drive system to change an output voltage level according to the requirements or desired parameters of a vehicle or other energy storage system that is being charged. The charging system includes a switching assembly for putting the charging system into different charging modes, and a controller for controlling the switching assembly and/or controlling drive system components to regulate output voltage (e.g., step up or step down a battery voltage to meet an energy storage system's charging parameters).

Embodiments described herein present numerous advantages and technical effects. The embodiments provide for effective V2V charging capability from a vehicle battery to another vehicle (e.g., an EV or hybrid), including both legacy and DC fast charging (DCFC). In addition, as the embodiments may utilize already existing components (e.g., controllers and/or converters), the embodiments provide a cost effective solution. For example, the embodiments utilize existing inverters for use as buck converters and boost converters to allow for a wide range of charging output voltages, thereby avoiding the need for a separate or dedicated buck-boost converter.

Although embodiments are discussed in conjunction with V2V charging, the embodiments are not so limited. For example, the charging system described herein can be configured to supply power to any desired storage system (e.g., vehicle-to-everything (V2X) charging).

The embodiments are not limited to use with any specific vehicle and may be applicable to various contexts. For example, embodiments may be used with automobiles, trucks, aircraft, construction equipment, farm equipment, automated factory equipment and/or any other device or system that includes multiple drives and/or multiple conversion devices.

FIG. 1 shows an embodiment of a motor vehicle 10, which includes a vehicle body 12 defining, at least in part, an occupant compartment 14. The vehicle body 12 also supports various vehicle subsystems including a propulsion system 16, and other subsystems to support functions of the propulsion system 16 and other vehicle components, such as a braking subsystem, a suspension system, a steering subsystem, and if the vehicle is a hybrid electric vehicle, a fuel injection subsystem, an exhaust subsystem and others.

The vehicle 10 may be an electrically powered vehicle (EV), a hybrid vehicle or any other vehicle that features multiple electric motors or drive systems. In an embodiment, the vehicle 10 is an electric vehicle that includes multiple motors and/or drive systems. For example, the propulsion system 16 is a multi-drive system that includes a first drive system 20 and a second drive system 30. The first drive system 20 includes a first electric motor 22 and a first inverter 24, as well as other components such as a cooling system 26. The second drive system 30 includes a second electric motor 32 and a second inverter 34, and other components such as a cooling system 36. The inverters 24 and 34 (e.g., traction power inverter units or TPIMs) each convert direct current (DC) power from a high voltage (HV) battery pack 44 to poly-phase (e.g., two-phase, three-phase, six-phase, etc.) alternating current (AC) power to drive the motors 22 and 32.

As shown in FIG. 1, the drive systems are configured such that the first electric motor 22 drives front wheels (not shown) and the second electric motor 32 drives rear wheels (not shown). However, embodiments are not so limited, as there may be any number of drive systems and/or motors at various locations (e.g., a motor driving each wheel, twin motors per axle, etc.). In addition, embodiments are not limited to a dual drive system, as embodiments can be used with a vehicle having any number of motors and/or power inverters.

The drive system 20 and the drive system 30 are electrically connected to a battery system 40, and may also be electrically connected to other components, such as vehicle electronics (e.g., via an auxiliary power module or APM 42).

The battery system 40 may be configured as a rechargeable energy storage system (RESS).

In an embodiment, the battery system 40 includes a battery assembly such as the battery pack 44. The battery pack 44 includes a plurality of battery modules 46, where each battery module 46 includes a number of individual cells (not shown). The battery system 40 may also include a monitoring unit 48 configured to receive measurements from sensors 50. Each sensor 50 may be an assembly or system having one or more sensors for measuring various battery and environmental parameters, such as temperature, current and voltages.

The vehicle 10 may include a dual motor drive-based charging system that can be used to charge the battery pack 44 and/or used for supplying power from the battery pack 44 to charge another energy storage system (e.g., V2V charging). The charging system includes an onboard charging module (OBCM) 56 that is electrically connected to a charge port 58 for charging from an energy storage system such as a utility AC power supply. The charge port 58 may be configured to accept DC power for fast charging of the battery pack 44 directly when connected via DC contactors (for example, switches 74 and 76 of FIG. 2).

Any of various controllers can be used to control functions of the charging system and/or other vehicle systems. A controller includes any suitable processing device or unit, and may use an existing controller such as the OCBM 56, and/or controllers in the drive system. For example, a controller 60 may be included for controlling charging operations as discussed herein.

The vehicle 10 also includes a computer system 62 that includes one or more processing devices 64 and a user interface 66. The computer system 62 may communicate with the charging system controller, for example, to provide commands thereto in response to a user input. The various processing devices, modules and units may communicate with one another via a communication device or system, such as a controller area network (CAN) or transmission control protocol (TCP) bus.

FIGS. 2-5 depict embodiments of the dual motor drive-based charging system (denoted herein as charging system 70), which are capable of transferring charge or supplying power to or from a second vehicle (e.g., vehicle-to-vehicle charging). The charging system 70 is capable of providing a wide variety of charging modalities, including conventional or legacy charging and DC fast charging (DCFC). Although embodiments are discussed in conjunction with V2V charging, the embodiments are not so limited and can be used to supply charge to any desired energy storage system (e.g., vehicle-to-trailer, vehicle-to-everything (V2X), etc.).

The charging system 70 is shown as being controlled by the controller 60. However, the charging system 70 or components thereof may be controlled by any suitable controller or processing device, such as a controller in the propulsion system or a controller of a battery management system (BMS).

Figure 2:
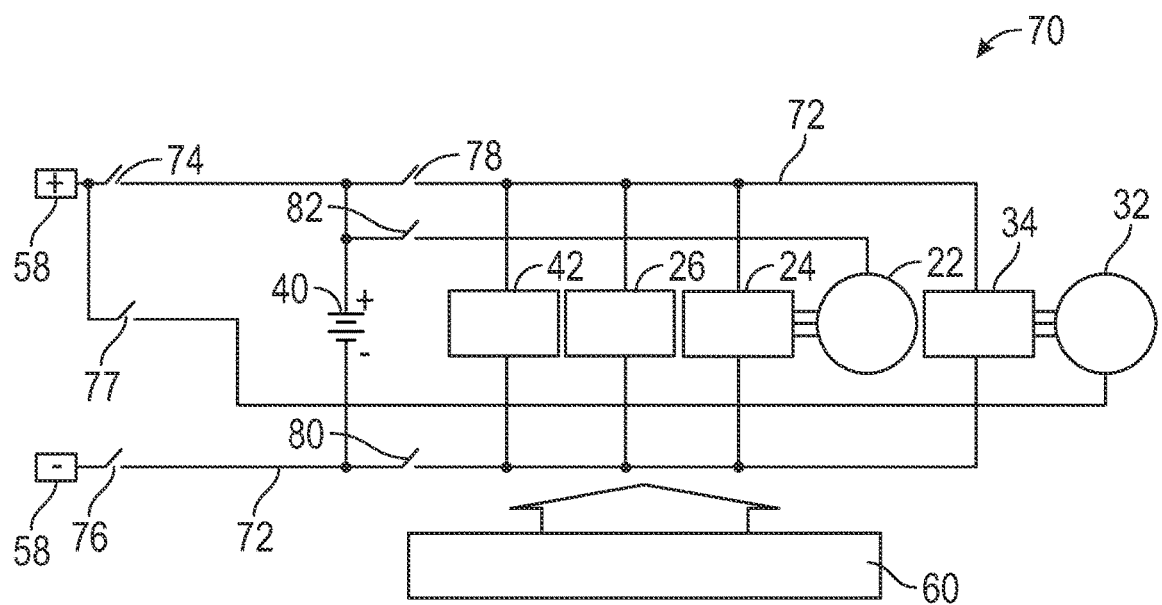
FIG. 2 depicts a charging system that includes a switching assembly and components of a dual motor or dual drive system in which inverters of the drive systems are connected in parallel at a high voltage (HV) direct current (DC) bus for charging, in accordance with an exemplary embodiment.

As shown, the first inverter 24 and the second inverter 34 are connected to a propulsion bus 72. Each of the first motor 22 and the second motor 32 is a three-phase motor having three phase motor windings. However, embodiments described herein are not so limited, as the first and second motors 22 and 32 may be any poly-phase machines supplied by poly-phase inverters. In the embodiment of FIG. 2, each inverter 24 and 34 has three branches for connecting to a phase A terminal, a phase B terminal and a phase C terminal, respectively, of an associated motor. In addition, each inverter 24 and 34 includes an upper switch and a lower switch connected to each phase of a motor, which can be modulated to generate AC current in a given phase.

The charging system 70 includes a switching assembly that has various switches controlled by the controller 60 for connecting and disconnecting the inverters 24 and 34 from the charge port 58. The controller 60 also controls switches within each inverter 24 and 34 (referred to herein as inverter switches) for controlling the use of the inverters 24 and 34 to provide charge at various voltages. Generally, the charging system 70 is able to charge a second vehicle at a higher voltage than the vehicle 10 battery voltage by controlling the switches and operating one of the first inverter 24 and the second inverter 34 as a boost converter, and charge the second vehicle at a lower voltage by controlling the switches and operating one of the first inverter 24 and the second inverter 34 as a buck converter. The charging system 70 may connect both inverters 24 and 34 to the charge port 58 and operate the inverters successively or simultaneously (e.g., to provide an intermediate voltage).

In this way, the charging system 70 is able to supply electrical energy over a wide range of voltages without needing an additional or separate buck-boost converter. For example, the charging system 70 uses existing inverters to step up or step down to achieve normal charging voltages (e.g., 400 V), and to achieve other voltages such as DCFC voltages (e.g., 800 V).

The charging system 70 includes switches to selectively connect the battery system 40 (B1) to the charge port 58 to provide DCFC or another charging scheme. For example, the charge port 58 is selectively connected to the battery 40 (B1) by switches 74 (SC1) and 76 (SC2). A switch 77 (SC3) selectively connects the second motor 32 and the second inverter 34 to the charge port 58.

The charging system 70 includes additional switches to allow the charging system 70 to operate components of the propulsion system 16 as buck and boost converters. In an embodiment, the switching assembly includes a switch 78 (S1) for selectively connecting the second inverter 34 (TPIM2) to a positive terminal of the battery system 40. The switching assembly also includes a switch 80 (S2) for selectively connecting the second inverter 34 to a negative terminal of the battery system 40. The switch 76 (SC2) selectively connects the first inverter 24 to the negative terminal of the charge port 58. A switch 82 (S3) selectively connects the first motor 22 to the positive terminal of the battery system 40.

In the embodiment of FIG. 2, the first motor 22 and the first inverter 24 (TPIM1) are used as a three-phase or two-phase interleaved boost converter during charging to step up the battery voltage to a desired voltage at the propulsion bus 72. The second motor 32 and the second inverter 34 are used as a three-phase or two-phase interleaved buck converter to step down voltage. The first inverter 24 and the second inverter 34 are connected in parallel on the DC side across the propulsion bus 72.

For example, the switch 82 (S3) is connected to a neutral point (e.g., a neutral terminal) or phase terminal of the first motor 22, and the switch 77 (SC3) is connected to a neutral point or phase terminal of the second motor 32. When the charging system 70 is in a charging mode, an inductance of the phase windings of the first motor 22 and the first inverter 24, and a DC bus capacitance of the first inverter 24, are used as part of a boost converter circuit. An inductance of the phase windings of the second motor 32 and the second inverter 34, and a DC bus capacitance of the second inverter 34, are used as part of a buck converter circuit.

The controller 60 controls the various switches in order to change between a propulsion mode and one or more charging modes. In the propulsion mode, the battery system 40 supplies power to the inverters 24 and 34 to drive the motors 22 and 32. To put the charging system 70 into the propulsion mode, the switch 78 (S1) and the switch 80 (S2) are closed (i.e., in an ON position), and the remaining switches 74 (SC1), 76 (SC2) and 82 (S3) are open (i.e., in an OFF position).

The controller 60 operates the switching assembly to put the system 70 in one or more charging modes. In an embodiment, a first charging mode ("boost mode") configures the charging system 70 to step up a received voltage from the battery system 40 to provide an output voltage to the charge port 58. A second charging mode ("buck mode") configures the charging system 70 to step down the voltage. The controller 60 can also put the charging system 70 into a third charging mode, or "buck-boost mode," in which both drive systems are used simultaneously or concurrently. The buck-boost mode is useful, for example, to output voltages that are between the stepped up voltage and the stepped down voltage.

To put the charging system 70 into the boost mode, the switches 77 (SC3) and 76 (SC2) are closed, and the switch 74 (SC1) is open. The switch 78 (S1) is open and switches 80 (S2) and 82 (S3) are closed. Lower switches (represented by switch S_2 in FIG. 3) in the first inverter 24 are pulse width modulated in an interleaved pattern with a duty cycle to achieve the desired boosted voltage at the propulsion bus 72. During the modulation of the lower switches in the first inverter 24, the upper switches (represented by switch S_3 in FIG. 3) in the second inverter 34 are maintained in a closed position (ON), and lower switches (represented by switch S_4 in FIG. 3) in the second inverter 34 are maintained in an open position (OFF), to pass the boosted voltage to the charge port 58 through the second motor 32 and the switch 77 (SC3).

To put the charging system 70 into the buck mode, the switch 74 (SC1) is open, and the switches 76 (SC2) and 77 (SC3) are closed. The switches 78 (S1) and 80 (S2) are closed, and the switch 82 (S3) is open. The upper switches in the second inverter 34 are pulse width modulated in an interleaved pattern with a duty cycle to achieve the desired reduced voltage at the second motor 32, which is passed to the charge port 58 through the switch 77 (SC3).

To put the charging system 70 into the buck-boost mode, the switch 78 (S1) is open, and the switches 80 (S2) and 82 (S3) are closed. The switch 74 (SC1) is open, and the switches 74 (SC2) and 77 (SC3) are closed. The lower switches in the first inverter 24 are pulse width modulated in an interleaved pattern with a duty cycle to achieve a desired boosted voltage at the propulsion bus 72 that is higher than the desired output charge voltage. The upper switches in the second inverter 34 are pulse width modulated in an interleaved pattern with a duty cycle to achieve a desired reduction of the propulsion bus voltage 72 to precisely deliver a desired voltage at the output of the second motor 32, and pass the desired voltage to the charge port 58 through the switch 77 (SC3).

The controller 60 can also put the charging system 70 into a "normal" or "pass-through" DC fast charging mode, in which the battery system 40 charges directly from a suitable DC fast charger. In the normal DC fast charging mode, switches 78 (S1) and 80 (S2) are closed, and the switch S3 is open. Switches 74 (SC1) and 76 (SC2) are closed, and the switch 77 (SC3) is open.

The following table illustrates various operating modes of the embodiment of FIG. 2:

| Operating Mode | S1 Switch position | S2 Switch position | S3 Switch position | SC1 Switch position | SC2 Switch position | SC3 Switch position |
|---|---|---|---|---|---|---|
| Key OFF | OFF | OFF | OFF | OFF | OFF | OFF |
| Propulsion | ON | ON | OFF | OFF | OFF | OFF |
| Buck-boost | OFF | ON | ON | OFF | ON | ON |
| Normal/pass-through | ON | ON | OFF | ON | ON | OFF |

Figure 3:
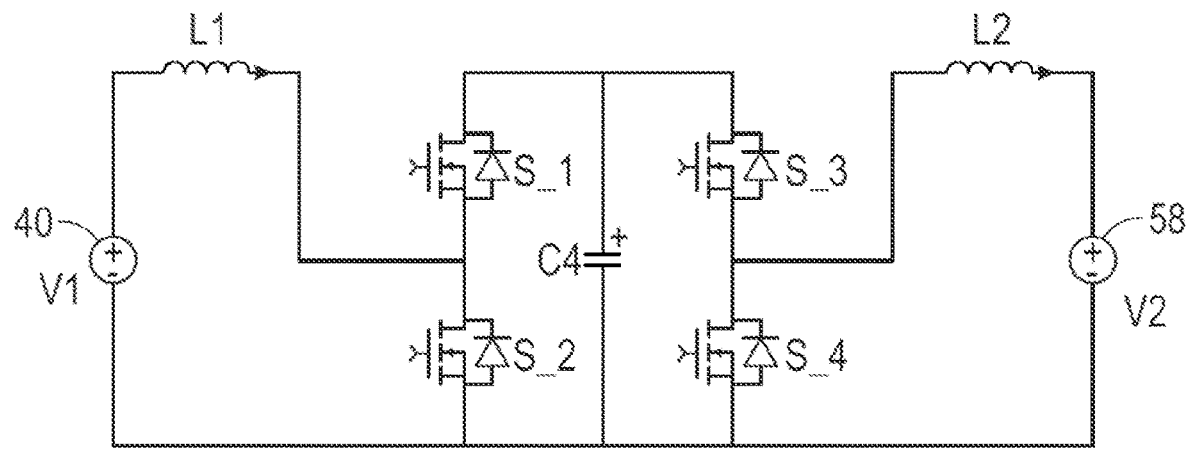
FIG. 3 depicts an equivalent circuit that represents the charging system of FIG. 2 in a buck-boost mode, in accordance with an exemplary embodiment.

FIG. 3 is a circuit diagram that represents an equivalent circuit defined by the switching assembly when the charging system 70 is in the buck-boost mode. A switch S_1 represents one or more upper switches in the first inverter 24, which are connected to one or more phases of the first motor 22, and a switch S_2 represents one or more lower switches in the first inverter 24 connected to the one or more phases of the first motor 22. Likewise, switch S_3 represents one or more upper switches in the second inverter 34, and switch S_4 represents one or more lower switches in the second inverter 34. L1 and L2 represent the winding inductance of the first motor 22 and the second motor 32, respectively, and C4 represents the total DC bus capacitance of the inverters 24 and 34 across the propulsion bus 72.

Figure 4:
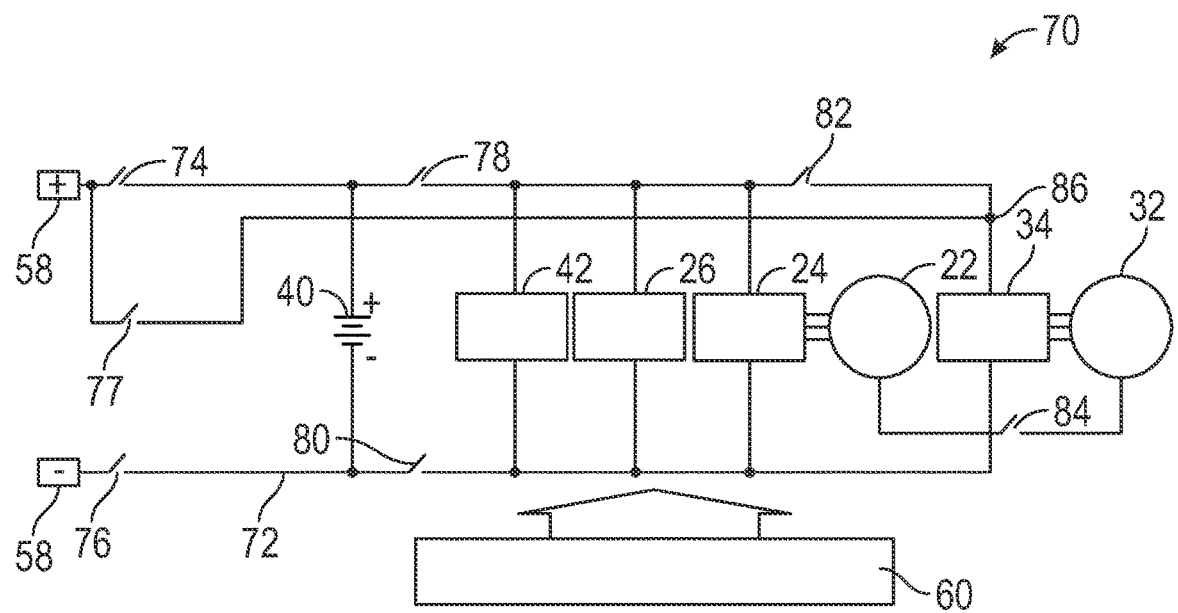
FIG. 4 depicts a charging system that includes a switching assembly and components of a dual motor or dual drive system in which motor windings of the dual motor or dual drive system are connected in series for charging, in accordance with an exemplary embodiment.

In the embodiment of FIG. 4, the first motor 22 and the first inverter 24 (TPIM1) are used as a three-phase or two-phase interleaved buck converter during charging to step down the battery voltage to a desired output charge voltage. The second motor 32 and the second inverter 34 are used as a three-phase or two-phase interleaved boost converter to step up voltage. The first motor 22 and the second motor 32 are connected via an additional switch 84 (S4), such that when the switch 84 (S4) is closed, the first motor 22 is connected in series to the second motor 32.

In this embodiment, the switch 77 (SC3) connects the positive terminal of the charge port 58 to the second inverter 34 via a line connected to the bus 72 at a node 86. The switch 84 (S4) selectively connects a neutral point (e.g., neutral terminal) of the first motor 22 to a neutral point of the second motor 32. In operation, the first motor 22 forms part of a buck converter circuit, and the second motor 32 forms part of a boost converter circuit.

The controller 60 controls the switching assembly in order to change between the propulsion mode and charging mode(s). To put the charging system 70 into the propulsion mode, the switch 78 (S1), the switch 80 (S2) and the switch 82 (S3) are closed. The switches 84 (S4), 74 (SC1), 76 (SC2) and 77 (SC3) are open.

To put the charging system 70 into a V2X charging mode, the switch 74 (SC1) is open, and the switches 76 (SC2) and 77 (SC3) are closed. The switches 78 (S1) and 80 (S2) are closed, and the switch 82 (S3) is open. The switch 84 (S4) is closed.

In the V2X charging mode, the controller 60 operates switches in the first inverter 24 and/or the second inverter 34 to configure the charging system 70 as a buck converter, a boost converter or a buck-boost converter. For example, in the boost mode, the lower switches (represented by switch S_4) in the second inverter 34 are operated to step up voltage. In the first inverter 24, one set of switches (e.g., the lower switches represented by switch S_2) is turned off, while another set of switches (e.g., the upper switches represented by switch S_1) is maintained in a closed position in a "pass-through mode" (i.e., current is transmitted therethrough without affecting voltage).

In the buck mode, the upper switches (switch S_1) in the first inverter 24 are operated to step down voltage. In the second inverter 34, one set of switches (e.g., the lower switches represented by switch S_4) is turned off, while another set of switches (e.g., the upper switches represented by switch S_3) is maintained in a closed position in the pass-through mode. In the buck-boost mode, a set of switches in the inverter 24 is operated to step down voltage, and a set of switches in the inverter 34 is operated to step up voltage.

In the normal DC fast charging mode, switches 78 (S1) and 80 (S2) are closed, the switch 82 (S3) and switch 84 (S4) are open. Switches 74 (SC1) and 76 (SC2) are closed, and the switch 77 (SC3) is open.

The following table illustrates various operating modes of the embodiment of FIG. 4:

| Operating Mode | S1 Switch position | S2 Switch position | S3 Switch position | S4 Switch position | SC1 Switch position | SC2 Switch position | SC3 Switch position |
|---|---|---|---|---|---|---|---|
| Key OFF | OFF | OFF | OFF | OFF | OFF | OFF | OFF |
| Propulsion | ON | ON | ON | OFF | OFF | OFF | OFF |
| V2X | ON | ON | OFF | ON | OFF | ON | ON |
| Normal | ON | ON | OFF | OFF | ON | ON | OFF |

Figure 5:
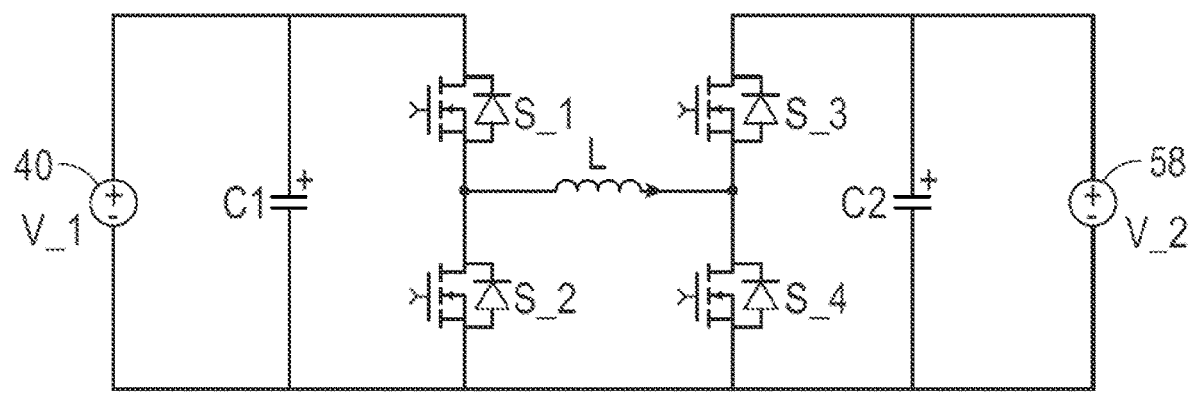
FIG. 5 depicts an equivalent circuit that represents the charging system of FIG. 4 in a buck-boost mode, in accordance with an exemplary embodiment.

FIG. 5 is a circuit diagram that represents an equivalent circuit defined by the switching assembly of FIG. 4 when the charging system 70 is in the charging mode. In this embodiment, C1 and C2 represent DC bus capacitances of the first inverter 24 and the second inverter 34, respectively. L represents the combined winding inductance of the motors 22 and 32 connected in series (when switch 84 (S4) is closed).

In the above embodiments, two electric motors and their respective inverters are used to define the conversion circuits and control charging according to the various modes. The embodiments are not so limited. For example, the conversion circuits can be similarly defined using a single electric motor having split phase winding sections and an isolated neutral point, where each winding section supplied by separate inverter.

Additional diagnostic and protection functions may be incorporated into the controller 60 to ensure the most efficient V2V charging at the requested power, voltage and current level using existing sensors and serial communication channels between various controllers.

Any suitable device may be employed as a switch. For example, the switches can include solid state relays and transistors such as Silicon (Si) insulated gate bipolar transistors (IGBTs), and field-effect transistors (FETs). Examples of FETs include metal-oxide-semiconductor FETs (MOSFETs), Si MOSFETs, silicon carbide (Sic) MOSFETs, gallium nitride (GaN) high electron mobility transistors (HEMTs), and SiC junction-gate FETs (JFETs). Other examples of switches that can be used include diamond, gallium oxide and other wide band gap (WBG) semiconductor-based power switch devices.

Figure 6:
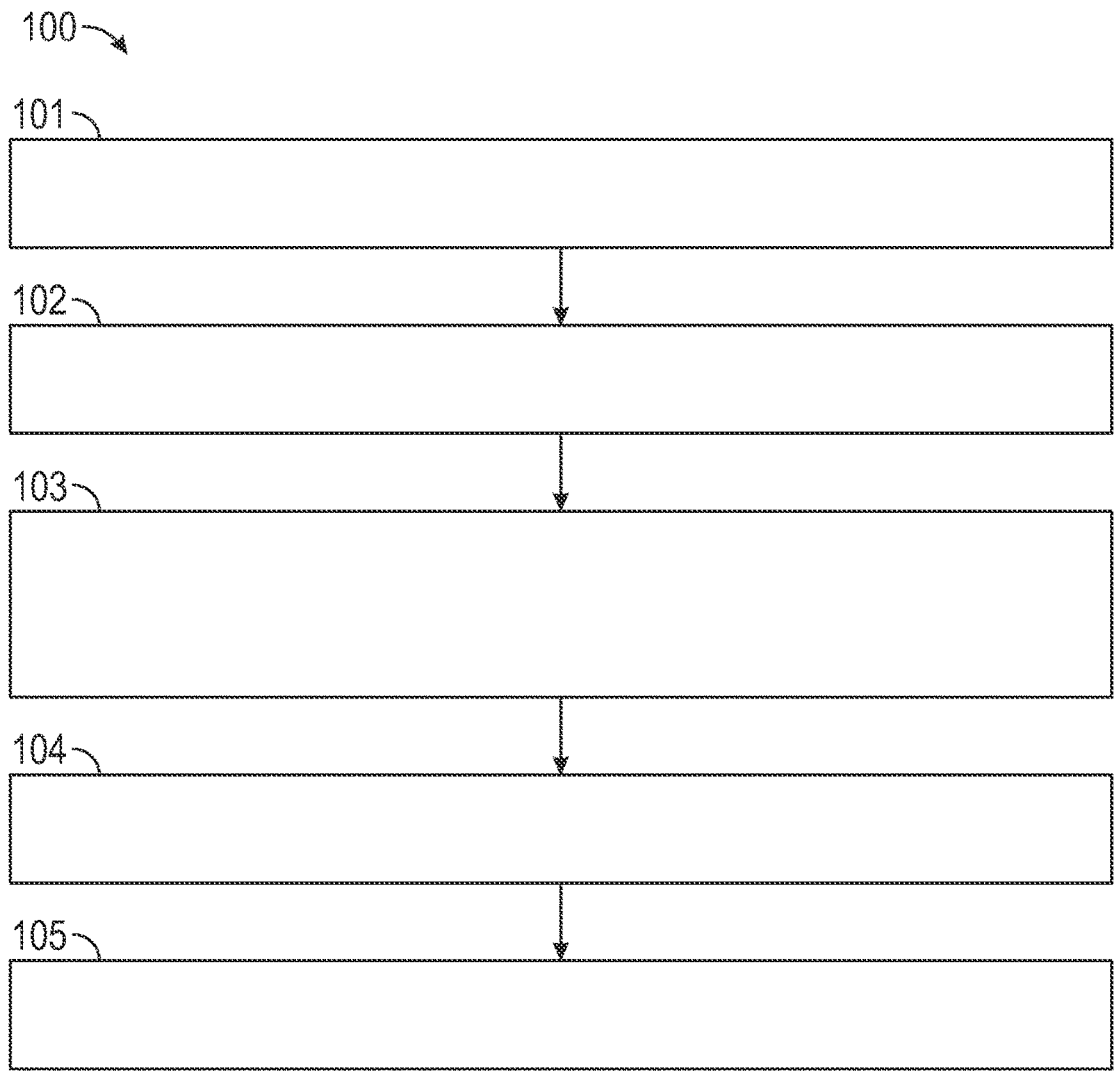
FIG. 6 is a flow diagram depicting aspects of a method of controlling a vehicle charging system and/or charging an energy storage system, in accordance with an exemplary embodiment.

FIG. 6 illustrates embodiments of a method 100 of controlling a propulsion system, and controlling the transfer of charge between a vehicle battery system and an energy storage system. In the method 100, charge is transferred from the vehicle 10 to a battery of a second vehicle. It is noted that the method 100 may be used to charge any suitable storage system, and is thus not limited to V2V charging.

Aspects of the method 100 may be performed by a processor or processors disposed in a vehicle, such as the controller 60. The method 100 is described in conjunction with an example in which the controller 60 is a separate controller, however the method 100 is not so limited, as the method may be performed by any suitable processing device or system, or combination of processing devices.

The method 100 includes a number of steps or stages represented by blocks 101-105. The method 100 is not limited to the number or order of steps therein, as some steps represented by blocks 101-105 may be performed in a different order than that described below, or fewer than all of the steps may be performed.

At block 101, the controller 60 determines if it is desired to charge a second vehicle battery by transferring energy from the battery pack 44 of the vehicle 10. The determination may be based on receiving a request (e.g., via user interaction with the vehicle 10 or a request from a second vehicle or other remote entity). Determination as to whether charging is desired may be based on user input, a wireless signal from the second vehicle or other information.

For example, the charging system 70 and/or other system (e.g., the computer system 62) receives a request via a V2V communication link from the second vehicle, which includes a request for V2V charging and specifies a requested current, voltage and power. The charging system 70 and/or other system may perform an authentication procedure to ensure that the second vehicle is authorized for V2V charging (e.g., the system authenticates the second vehicle to determine whether the second vehicle is part of a vehicle fleet).

At block 102, the second vehicle is connected (e.g., via a charge cable) to the charge port 58. The voltage of the second vehicle's battery (second vehicle battery voltage) is read. The controller 60 may determine various charge parameters such as the second vehicle's nominal battery voltage, maximum allowable charge current and desired charge energy.

At block 103, the controller 60 transitions the vehicle 10 from a propulsion mode to a charging mode. The controller 60 may put the vehicle in a charging mode by controlling switches and defining conversion circuits, as discussed herein. Various switches are controlled as discussed above to put the charging system into a buck mode, a boost mode or a buck-boost mode.

At block 104, the controller 60 controls the charging system 70 and switches to operate a boost converter circuit (with either the first inverter 24 and the first motor 22, or the second inverter 34 and the second motor 32) and/or operate a buck converter circuit (with either the first inverter 24 and the first motor 22, or the second inverter 34 and the second motor 32). For example, the switching assembly can be controlled to only operate the boost converter circuit if voltages are stepped up, or only operate the buck converter circuit to step down. In an embodiment, control may include operating the boost and buck converter circuits simultaneously or concurrently to generate an intermediate voltage.

At block 105, the second vehicle is disconnected from the charge port 58. The controller 60 transitions the vehicle 10 back to the propulsion mode by controlling switches as discussed herein.

Figure 7:
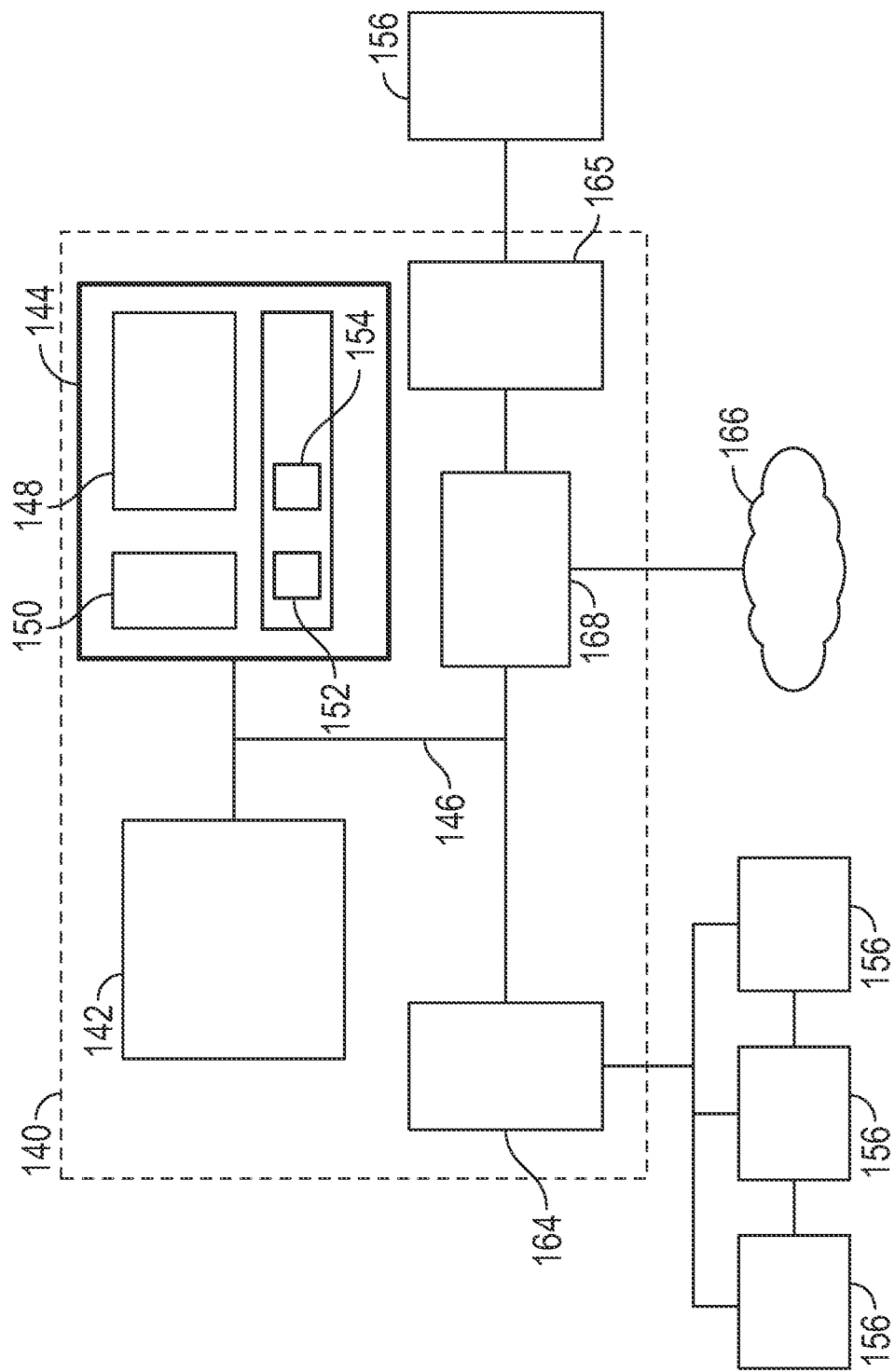
FIG. 7 depicts a computer system in accordance with an exemplary embodiment.

FIG. 7 illustrates aspects of an embodiment of a computer system 140 that can perform various aspects of embodiments described herein. The computer system 140 includes at least one processing device 142, which generally includes one or more processors for performing aspects of image acquisition and analysis methods described herein.

Components of the computer system 140 include the processing device 142 (such as one or more processors or processing units), a memory 144, and a bus 146 that couples various system components including the system memory 144 to the processing device 142. The system memory 144 can be a non-transitory computer-readable medium, and may include a variety of computer system readable media. Such media can be any available media that is accessible by the processing device 142, and includes both volatile and non-volatile media, and removable and non-removable media.

For example, the system memory 144 includes a non-volatile memory 148 such as a hard drive, and may also include a volatile memory 150, such as random access memory (RAM) and/or cache memory. The computer system 140 can further include other removable/non-removable, volatile/non-volatile computer system storage media.

The system memory 144 can include at least one program product having a set (e.g., at least one) of program modules that are configured to carry out functions of the embodiments described herein. For example, the system memory 144 stores various program modules that generally carry out the functions and/or methodologies of embodiments described herein. A module 152 may be included for performing functions related to monitoring a propulsion system, and a module 154 may be included to perform functions related to switching between charging modes and controlling aspects of the propulsion system to generate output voltages and perform charging as described herein. The system 140 is not so limited, as other modules may be included. As used herein, the term "module" refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The processing device 142 can also communicate with one or more external devices 156 as a keyboard, a pointing device, and/or any devices (e.g., network card, modem, etc.) that enable the processing device 142 to communicate with one or more other computing devices. Communication with various devices can occur via Input/Output (I/O) interfaces 164 and 165.

The processing device 142 may also communicate with one or more networks 166 such as a local area network (LAN), a general wide area network (WAN), a bus network and/or a public network (e.g., the Internet) via a network adapter 168. It should be understood that although not shown, other hardware and/or software components may be used in conjunction with the computer system 40. Examples include, but are not limited to: microcode, device drivers, redundant processing units, external disk drive arrays, RAID systems, and data archival storage systems, etc.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this invention belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A charging system of a vehicle, comprising:
   a first conversion device of a first drive system of the vehicle, the first conversion device connected to a first electric motor;
   a second conversion device of a second drive system of the vehicle, the second conversion device connected to a second electric motor, the first drive system and the second drive system connected to a battery system of the vehicle;
   a switching assembly including a plurality of switches configured to selectively connect at least one of the first electric motor and the second electric motor to a charge port of the vehicle; and
   a controller configured to control the switching assembly to form a conversion circuit that includes components of at least one of the first drive system and the second drive system, and control the conversion circuit to regulate an output voltage and supply power to an energy storage system, wherein the conversion circuit includes at least one of a boost converter circuit and a buck converter circuit, and the controller is configured to perform at least one of:
      forming the boost converter circuit by disconnecting the battery system from a propulsion bus, controlling the switching assembly to connect the battery system to the charge port, and connecting the battery system and the charge port to a phase of the first motor and to a switching device of the first conversion device; and
      forming the buck converter circuit by disconnecting the battery system from the propulsion bus, controlling the switching assembly to connect the battery system to the charge port, and connecting the battery system and the charge port to a phase of the second motor and to a switching device of the second conversion device.

2. The charging system of claim 1, wherein the energy storage system includes a battery of a second vehicle.

3. The charging system of claim 1, wherein the first inverter and the second inverter are connected in parallel across the propulsion bus.

4. The charging system of claim 3, wherein the first conversion device is a first inverter and the second conversion device is a second inverter.

5. The charging system of claim 1, wherein the controller is configured to perform at least one of:
   stepping up a received voltage from the battery assembly to the output voltage by operating the switching device of the first conversion device; and
   stepping down the received voltage to the output voltage by operating the switching device of the second conversion device.

6. The charging system of claim 1, wherein the controller is configured to simultaneously form the boost converter circuit and the buck converter circuit to increase or decrease a received voltage.

7. The charging system of claim 1, wherein one of the first conversion device and the second conversion device is operated in a pass-through mode while another of the first conversion device and the second conversion device is operated to form the buck converter circuit or the boost converter circuit.

8. The charging system of claim 1, wherein the first conversion device is a first inverter and the second conversion device is a second inverter, and wherein the switching assembly includes a first switch configured to selectively connect a phase of the first motor and the first inverter to the charge port, and a second switch configured to selectively connect a phase of the second motor and the second inverter to the charge port.

9. The charging system of claim 8, wherein the first switch is connected to a neutral point of the first motor, and the second switch is connected to a neutral point of the second motor.

10. A method of charging an energy storage system from a battery system of a vehicle, comprising:
    receiving a request to charge the energy storage system from the vehicle, the vehicle including a first drive system having a first conversion device connected to a first electric motor, and a second drive system having a second conversion device connected to a second electric motor, the first drive system and the second drive system connected to the battery system of the vehicle;
    determining charging parameters including a requested charging voltage;
    controlling a switching assembly including a plurality of switches to selectively connect at least one of the first electric motor and the second electric motor to a charge port of the vehicle, and form a conversion circuit that includes components of at least one of the first drive system and the second drive system; and
    controlling the conversion circuit to regulate an output voltage to supply power to the energy storage system at the requested charging voltage, wherein the conversion circuit includes at least one of a boost converter circuit and a buck converter circuit, and forming the conversion circuit includes at least one of:

forming the boost converter circuit by disconnecting the battery system from a propulsion bus, controlling the switching assembly to connect the battery system to the charge port, and connecting the battery system and the charge port to a phase of the first motor and to a switching device of the first conversion device; and forming the buck converter circuit by disconnecting the battery system from the propulsion bus, controlling the switching assembly to connect the battery system to the charge port, and connecting the battery system and the charge port to a phase of the second motor and to a switching device of the second conversion device.

11. The method of claim 10, wherein the energy storage system includes a battery of a second vehicle.

12. The method of claim 10, wherein the first conversion device is a first inverter and the second conversion device is a second inverter.

13. The method of claim 10, wherein controlling the switching assembly includes at least one of:

stepping up a received voltage from the battery assembly to the output voltage by operating the switching device of the first conversion device; and stepping down the received voltage to the output voltage by operating the switching device of the second conversion device.

14. The method of claim 10, wherein forming the conversion circuit includes simultaneously forming the boost converter circuit and the buck converter circuit to increase or decrease a received voltage.

15. The method of claim 10, wherein one of the first conversion device and the second conversion device is operated in a pass-through mode while another of the first conversion device and the second conversion device is operated to form the buck converter circuit or the boost converter circuit.

16. A vehicle system comprising:

a memory having computer readable instructions; and a processing device for executing the computer readable instructions, the computer readable instructions controlling the processing device to perform a method including:

receiving a request to charge an energy storage system from the vehicle, the vehicle including a first drive system having a first conversion device connected to a first electric motor, and a second drive system having a second conversion device connected to a second electric motor, the first drive system and the second drive system connected to a battery system of the vehicle;

determining charging parameters including a requested charging voltage;

controlling a switching assembly including a plurality of switches to selectively connect at least one of the first electric motor and the second electric motor to a charge port of the vehicle, and form a conversion circuit that includes components of at least one of the first drive system and the second drive system; and controlling the conversion circuit to regulate an output voltage to supply power to the energy storage system at the requested charging voltage, wherein the conversion circuit includes at least one of a boost converter circuit and a buck converter circuit, and forming the conversion circuit includes at least one of:

forming the boost converter circuit by disconnecting the battery system from a propulsion bus, controlling the switching assembly to connect the battery system to the charge port, and connecting the battery system and the charge port to a phase of the first motor and to a switching device of the first conversion device; and forming the buck converter circuit by disconnecting the battery system from the propulsion bus, controlling the switching assembly to connect the battery system to the charge port, and connecting the battery system and the charge port to a phase of the second motor and to a switching device of the second conversion device.

17. The vehicle system of claim 16, wherein the first inverter and the second inverter are connected in parallel across the propulsion bus.

18. The vehicle system of claim 16, wherein controlling the switching assembly includes at least one of:

stepping up a received voltage from the battery assembly to the output voltage by operating the switching device of the first conversion device; and stepping down the received voltage to the output voltage by operating the switching device of the second conversion device.

19. The vehicle system of claim 16, wherein forming the conversion circuit includes simultaneously forming the boost converter circuit and the buck converter circuit to increase or decrease a received voltage.

20. The vehicle system of claim 16, wherein the first conversion device is a first inverter and the second conversion device is a second inverter.

* * * * *